United States Patent

[11] 3,576,195

| [72] | Inventor | William P. Richard, Jr.<br>Monroe, La. |
|---|---|---|
| [21] | Appl. No. | 791,848 |
| [22] | Filed | Dec. 16, 1968 |
| [45] | Patented | Apr. 27, 1971 |
| [73] | Assignee | Cities Service Company |

[54] APPARATUS ALLOWING ACCESS TO A PRESSURIZED FLUID CHAMBER
7 Claims, 2 Drawing Figs.

[52] U.S. Cl.................................................... 137/317, 137/318
[51] Int. Cl..................................................... F16k 51/00
[50] Field of Search........................................... 137/577.5, 315, 318, 317; 239/533

[56] References Cited
UNITED STATES PATENTS

| 2,805,273 | 9/1957 | Cuthbert.................... | 137/317X |
| 2,911,859 | 11/1959 | Longley et al............... | 137/318X |
| 3,229,711 | 1/1966 | Leopold, Jr. et al......... | 137/318 |
| 3,460,765 | 8/1969 | Lord............................ | 137/315X |

*Primary Examiner*—William R. Cline
*Attorney*—J. Richard Geaman

ABSTRACT: Means for inserting and removing an elongated member through an opening in the wall of a chamber without significant flow of material through the opening which would be caused by a difference in pressure on either side of the wall. Inserted members such as pipes, probes and the like extend through a conduit which communicates with the chamber, and seal means is provided between the external surface of the inserted member and the inside wall of the conduit. Valve means for opening and closing the conduit to flow of material is located between the seal means and the opening in the chamber wall. The inserted member is movable back and forth within the conduit and the valve means is adapted for passage of the member through it.

PATENTED APR 27 1971
3,576,195
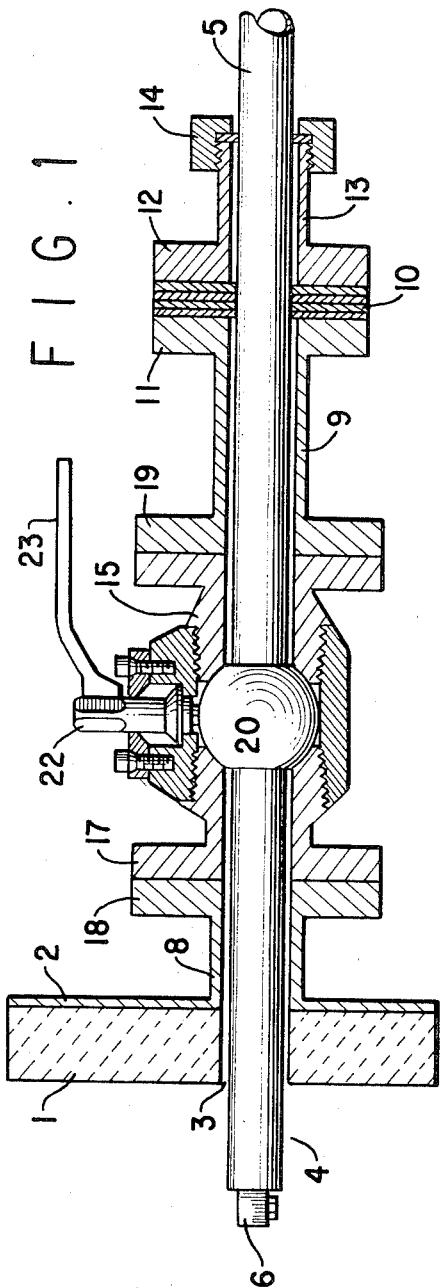
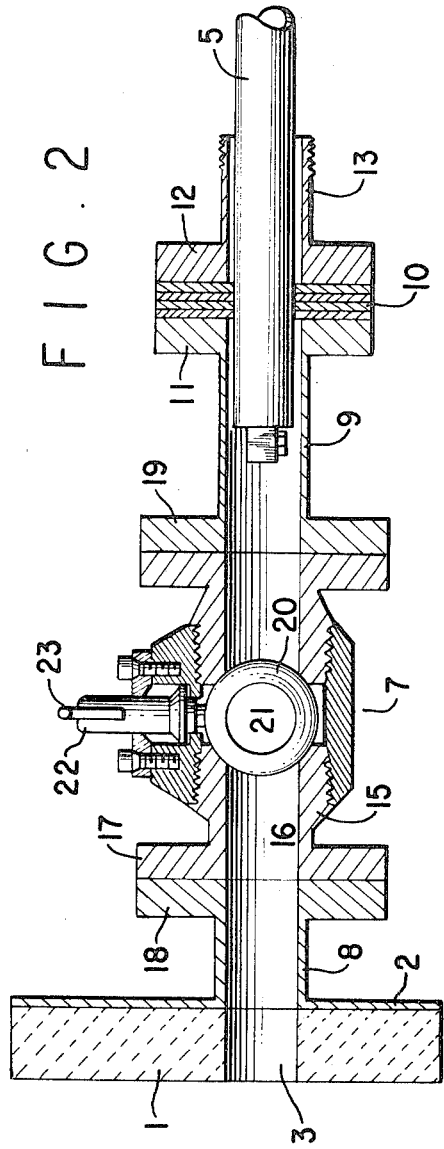
INVENTOR
WILLIAM P. RICHARD, JR.
BY
ATTORNEY 3,576,195

APPARATUS ALLOWING ACCESS TO A PRESSURIZED FLUID CHAMBER

BACKGROUND OF THE INVENTION

1. Field of the Invention

This invention relates to apparatus for acquiring access to the interior of a chamber by means of an inserted member such as a fluid-conveying conduit, condition-measuring probe or the like, while preventing flow of material into or out of the chamber during insertion and removal of the member.

2. Description of the Prior Art

Fluid materials are often handled or processed within an enclosed chamber having an internal pressure significantly different than the outside pressure. It is frequently necessary to insert fluid-conveying conduits or probes into the chamber, the latter being employed, for instance, to measure temperature, pressure, velocity, humidity, or the like, inside of the chamber. It is difficult, however, to insert or remove such members from the chamber without leakage of material through the access opening for the member, i.e. if the chamber pressure is superatmospheric, its contents leak out, and air leaks in if the pressure is subatmospheric. While such an occurrence is not always objectionable, in other instances it is, and in some cases can be highly unsafe. With a chamber containing gases at high temperature and superatmospheric pressure, for example, it may be desirable to manually insert a liquid-conveying conduit such as a quench spray or a measuring probe, but this can be a dangerous practice if insertion and/or removal of the member is accompanied by discharge of hot gas out of the access opening. In other cases air can be drawn into a chamber containing a material which oxidizes readily or which ignites spontaneously upon contact with air. At any rate, it is desirable to prevent leakage of material through the access opening during insertion or removal of the member from the chamber.

SUMMARY OF THE INVENTION

It is therefore an object of this invention to provide means for passing an elongated member into a region of different pressure while preventing significant flow of material into the region of lower pressure.

It is also an object of this invention to provide means for inserting pipes, probes and the like into a chamber which contains a fluid under a different pressure than exists outside the chamber, said means preventing leakage of material into or out of the chamber during insertion and removal of the pipe, probe or the like therefrom.

It is a further object of this invention to provide means for safe insertion and removal of pipes, probes and the like from chambers which contain hazardous materials.

Other objects and advantages of the invention will become apparent from the following description and the appended claims.

The present invention comprises a conduit and an elongated member, such as a pipe or probe, which is inserted longitudinally into the conduit. The member is movable back and forth with respect to the longitudinal axis of the conduit, and a sealing means bridges the space which exists between the internal wall surface of the conduit and the external wall of the elongated member. A valve, for opening and closing the conduit to the flow of material, is located between the sealing means and the end of the conduit which is opposite the end into which the elongated member is inserted, and the valve is adapted for passage of the elongated member through it when the valve is in the open position.

Arranged accordingly, the flow of significant amounts of material through the conduit, during insertion and removal of the elongated member, can be avoided even though the pressure which exists at one end of the conduit is significantly different from that which exists at the other end. In practice, the elongated member is partially inserted into the conduit while the valve is closed, but the insertion is to a distance sufficient to engage the seal means. Subsequently, the valve is opened for further insertion of the member, the flow of fluid through the conduit being prevented by the seal means. The member may then be inserted still further into the conduit through the valve, and to any desired position beyond it. A reverse procedure is employed for withdrawing the elongated member from the conduit: the member is first retracted beyond the valve and the valve is then closed before the seal is broken.

It is not essential that the invention be conjunctive with a distinctly separate chamber for containing a fluid material, since a portion of the conduit beyond the valve may serve as a container for the material, but as previously indicated the invention can be employed for gaining access to a separate chamber in which the material is processed or handled. In such cases the conduit is affixed to the wall of the chamber and communicates with the chamber through an opening in the wall. Accordingly, the valve is located between the seal means and the wall opening.

Any suitable valve may be employed in practicing the invention, e.g. a swinging check valve, gate valve, as long as it permits passage of the elongated member back and forth through the valve body. With cylindrical conduits, a ball valve may be employed to particular advantage, since such valves present no obstruction to passage of the member through the body when the valve is open, but fully prevent the passage of fluids when closed.

Likewise, the design of the seal means is variable and the sealing surfaces thereof can be constructed of any suitable material. It is essential that the seal be constructed so that it prevents significant flow of the material through the conduit when the elongated member is inserted therein the valve is opened. Furthermore, the sealing surfaces should be adapted for slidable back and forth movement of the elongated member while still providing a sealed condition. Accordingly, the seal member can be made from essentially yieldable or nonyieldable materials such as rubber, plastic, fabric, asbestos, metal, or composites thereof.

Generally, the elongated member will be straight and rigid, in which case the conduit, seal and member can be aligned coaxially, but it will be understood that coaxial alignment is not essential since a flexible member can be employed with a conduit, valve, and seal which are out of alignment with each other. Furthermore, the elongated member may be inserted eccentrically with respect to the conduit axis.

BRIEF DESCRIPTION OF THE DRAWINGS

FIG. 1 shows one embodiment of the invention in section, the elongated member being fully inserted into the conduit through the valve.

FIG. 2 also shows the same embodiment of the invention as FIG. 1, but with the valve closed and the elongated member withdrawn beyond the valve.

DESCRIPTION OF A PREFERRED EMBODIMENT

The drawings depict use of the invention for insertion and removal of a water quench spray from a chamber which contains high-temperature gases under pressure. The chamber wall consists of refractory insulation 1 supported by a steel outer shell 2. An access opening 3 for the quench spray, shown generally at 4, extends through the chamber wall. The quench spray comprises an elongated, straight and rigid, cylindrical pipe 5 having an atomizer nozzle 6 for discharging a spray of water droplets into the chamber. Water is supplied to the nozzle through the pipe 5. A ball valve, shown generally at 7, is flange mounted on one side to a section of pipe 8 and on the other side to another section of pipe 9. One end of the pipe section 8 is affixed to the steel shell 2 and is arranged coaxially with relation to the opening 3. A seal member 10, having a circular center opening for the pipe 5, is clamped in place between the flange 11 on pipe section 9 and the flange 12 on still another pipe section 13. The pipe sections 8, 9, 13 and the fluid passageway through valve 7 all have essentially the same inside diameter and are all aligned coaxially to form a conduit assembly through which the quench spray can be extended into the chamber. As illustrated, the pipe 5 has an outside diameter somewhat smaller than the inside diameter of the conduit assembly, but the center opening in seal 10 is essentially the same size as the outside diameter of pipe 5 so that the quench spray 4 can slide freely back and forth within the conduit assembly while at the same time maintaining an effective seal between the outside of pipe 5 and the inside of the conduit. Once the atomizer nozzle 6 has been positioned as desired within the chamber, the spray can be locked into position by tightening a clamping ring 14, which is threaded onto pipe section 13, to secure pipe 5 from back and forth or rotative movement.

The ball valve 7 consists of a body 15, with a central passageway 16 that forms part of the conduit assembly. Flanges 17 mate with flanges 18 and 19 which are attached to pipe sections 8 and 9, respectively. The ball 20, rotatable in the valve body 15, has a center opening 21. The ball is rotated by means of a shaft 22 and an attached handle 23. For insertion of the quench spray into the chamber, the ball is rotated to the position shown in FIG. 1 so that the center opening is aligned coaxially with the conduit assembly. When the quench spray is withdrawn beyond the valve, the ball is turned to the position shown in FIG. 2 so that the passage of fluid through the conduit assembly is obstructed.

FIG. 1 shows the quench spray inserted into the chamber, the spray extending longitudinally through the conduit assembly, including the opening 21 in the ball 19. FIG. 2 shows the quench spray just prior to insertion or withdrawal of the spray with regard to the valve. Upon insertion of the spray, the conduit 5 is inserted through the seal 10 before the valve is opened, and upon withdrawal of the spray, conduit 5 is not withdrawn beyond the seal until the valve is closed.

In practice, the spray 4 is first placed into conduit 13 and inserted through the seal 10 while valve 7 is in the closed position. Once a seal has been established between conduit 5 and the seal means, valve 5 is then opened and the spray is further inserted through the valve for positioning of the atomizer nozzle in the chamber. When it is necessary to remove the spray from the conduit assembly, e.g. for inspection, cleaning, repair or relocation—the spray is first withdrawn beyond the valve ball 20, but not beyond the seal 10, and the ball is then rotated to a closed position. Once the valve has been closed the conduit 5 can then be withdrawn beyond the seal, and out of the conduit assembly, without substantial leakage of material through the opening 3 in the chamber wall.

In the drawings, the seal means 10 is shown affixed to the conduit assembly whereby the conduit 5 slips through a center opening in the seal. It will be understood, however, that the seal can be affixed to conduit 5 whereby the seal member is moved back and forth therewith while sliding over the internal surface of the conduit assembly.

It will be understood that various changes may be made in apparatus and arrangements thereof, which have been referred to herein to explain the nature of the invention, without departing from its spirit or scope as expressed in the appended claims.

I claim:
1. Apparatus comprising, in combination:
   a. a conduit,
   b. an elongated member inserted into said conduit through one end thereof and extending essentially longitudinally therein, said member being movable back and forth within the conduit with respect to the longitudinal axis thereof,
   c. sealing means between the internal wall surface of said conduit and the external surface of said elongated member,
   d. valve means for opening and closing said conduit to the flow of material, said valve means being located between said sealing means and the end of the conduit which is opposite to the end into which said member is inserted, said valve means being adapted for through passage of the elongated member when the valve means is in the open position, and,
   e. a clamp ring threaded onto the outer end of said conduit and adapted to secure said elongated member from back and forth or rotative movement upon tightening of said ring and which releases said member when loosened.
2. The apparatus of claim 1 in which the valve means is a ball valve.
3. The apparatus of claim 1 in which the elongated member, the sealing means and the valve means are coaxially aligned with respect to the longitudinal axis of the conduit.
4. The apparatus of claim 1 in which the elongated member is a conduit.
5. The apparatus of claim 1 in which the elongated member is a probe.
6. The apparatus of claim 1 in which the sealing means is affixed to the conduit and the elongated member is slidable back and forth through an opening in said sealing means.
7. Apparatus comprising:
   a. a chamber for containing a fluid material at a pressure different from the pressure outside of the chamber,
   b. a conduit affixed to the wall of the chamber and communicating with the chamber through an opening in said wall,
   c. an elongated member inserted essentially longitudinally into said conduit, said member being movable back and forth with respect to the axis of the conduit,
   d. sealing means between the internal wall surface of said conduit and the external surface of said elongated member,
   e. valve means for opening and closing said conduit to the flow of material, said valve means being located between said opening in the wall of the chamber and said seal means, said valve means being adapted for through passage of the member when the valve means is in the open position, and,
   f. a clamp ring threaded onto the outer end of said conduit and adapted to secure said elongated member from back and forth or rotative movement upon tightening of said ring and which releases said member when loosened, whereby a seal is first established between the conduit and the inserted member while the valve is closed and the valve is then opened to permit further insertion of the member into the conduit, and upon retraction from the conduit the member is first withdrawn beyond the valve, but without breaking the seal, and the valve is then closed prior to breaking the seal, thereby preventing the flow of substantial amounts of the material through the opening in the chamber wall during insertion and removal of the elongated member from the conduit.